(12) United States Patent
Sun

(10) Patent No.: US 6,219,228 B1
(45) Date of Patent: Apr. 17, 2001

(54) DESKTOP LIQUID CRYSTAL DISPLAY COMPUTER

(75) Inventor: Ming-Shen M. Sun, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/391,451

(22) Filed: Sep. 8, 1999

(51) Int. Cl.[7] ............................................. G06F 1/16
(52) U.S. Cl. ...................... 361/683; 361/680; 361/725; 312/223.2
(58) Field of Search .......................... 361/683, 724–727, 361/680, 681; 312/223.2, 223.3; 400/713, 714; 206/320, 576

(56) References Cited

U.S. PATENT DOCUMENTS

| | | | |
|---|---|---|---|
| 5,777,704 | * | 7/1998 | Selker ................................. 361/680 |
| 5,975,780 | * | 11/1999 | Fukami ............................... 400/691 |
| 6,078,495 | * | 6/2000 | Cipolla et al. ..................... 361/680 |

* cited by examiner

Primary Examiner—Leo P. Picard
Assistant Examiner—Hung Van Duong
(74) Attorney, Agent, or Firm—Pillsbury Winthrop LLP

(57) ABSTRACT

A desktop liquid crystal display computer includes a computer housing, a lower cover member and a computer keyboard. The computer housing has a front side with a liquid crystal display panel mounted thereat, and a computer main board mounted in the computer housing and connected electrically to the display panel. The lower cover member includes a lower cover plate body having an inner wall surface and opposite lateral sides that are mounted pivotally on the computer housing about a lower horizontal axis. The lower cover member is movable relative to the computer housing between an uncovering position, where the lower cover plate body extends forwardly of the computer housing and is generally transverse to the display panel, and where the inner wall surface of the lower cover plate body faces upwardly, and a covering position, where the lower cover plate body is disposed in front of the computer housing and is generally parallel to the display panel, and where the inner wall surface of the lower cover plate body confronts the display panel. The computer keyboard is mounted on the inner wall surface of the lower cover plate body.

26 Claims, 16 Drawing Sheets

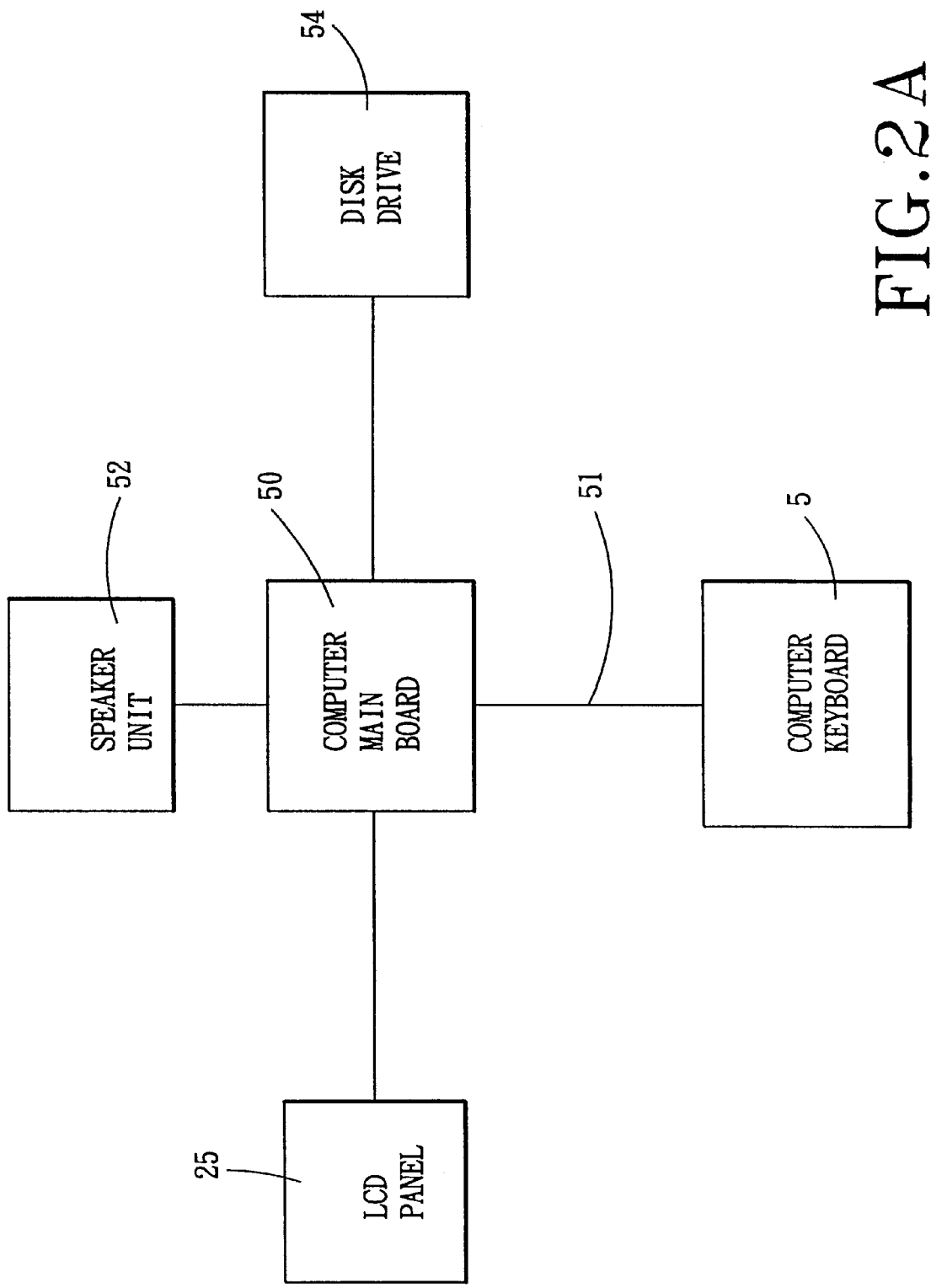

DESKTOP LIQUID CRYSTAL DISPLAY COMPUTER

BACKGROUND OF THE INVENTION

1. Field of the Invention

The invention relates to a desktop computer, more particularly to a highly portable desktop liquid crystal display computer.

2. Description of the Related Art

Referring to FIG. 1, a conventional desktop computer is shown to comprise a main computer housing 12, a computer monitor 10, such as a cathode ray tube (CRT) or a liquid crystal display (LCD) monitor, a computer keyboard 16, a computer mouse 18, and a speaker unit 20. The different components of the conventional desktop computer are generally separate from each other, thereby resulting in many inconveniences to the user. For example, the conventional desktop computer occupies a relatively large amount of space on a desk when in use. In addition, a large amount of time and effort is required to move all of the components of the conventional desktop computer from one place to another.

SUMMARY OF THE INVENTION

The main object of the present invention is to provide a highly portable desktop liquid crystal display computer.

Another object of the present invention is to provide a desktop liquid crystal display computer with cover members that are capable of shielding a liquid crystal display panel thereof.

According to the present invention, a desktop liquid crystal display computer comprises:

a computer housing having a front side with a liquid crystal display panel mounted thereat, and a computer main board mounted in the computer housing and connected electrically to the liquid crystal display panel;

a lower cover member including a lower cover plate body having an inner wall surface and opposite lateral sides that are mounted pivotally on the computer housing about a lower horizontal axis, the lower cover member being movable relative to the computer housing between an uncovering position, where the lower cover plate body extends forwardly of the computer housing and is generally transverse to the liquid crystal display panel and where the inner wall surface of the lower cover plate body faces upwardly and is disposed at a height generally lower than the liquid crystal display panel, and a covering position, where the lower cover plate body is disposed in front of the computer housing and is generally parallel to the liquid crystal display panel and where the inner wall surface of the lower cover plate body confronts the liquid crystal display panel; and a computer keyboard mounted on the inner wall surface of the lower cover plate body.

In the preferred embodiment, the liquid crystal display panel has an upper portion and a lower portion shielded by the lower cover member when the lower cover member is in the covering position. An upper cover member has an upper cover plate body, and is movable relative to the computer housing between an uncovering position, where the upper cover plate body is generally transverse to the liquid crystal display panel, and a covering position, where the upper cover plate body is disposed in front of the computer housing and is generally parallel to the liquid crystal display panel to shield the upper portion of the liquid crystal display panel.

BRIEF DESCRIPTION OF THE DRAWINGS

Other features and advantages of the present invention will become apparent in the following detailed description of the preferred embodiments with reference to the accompanying drawings, of which:

FIG. 2A is a schematic block diagram of the first preferred embodiment;

DETAILED DESCRIPTION OF THE PREFERRED EMBODIMENTS

Figure 1:
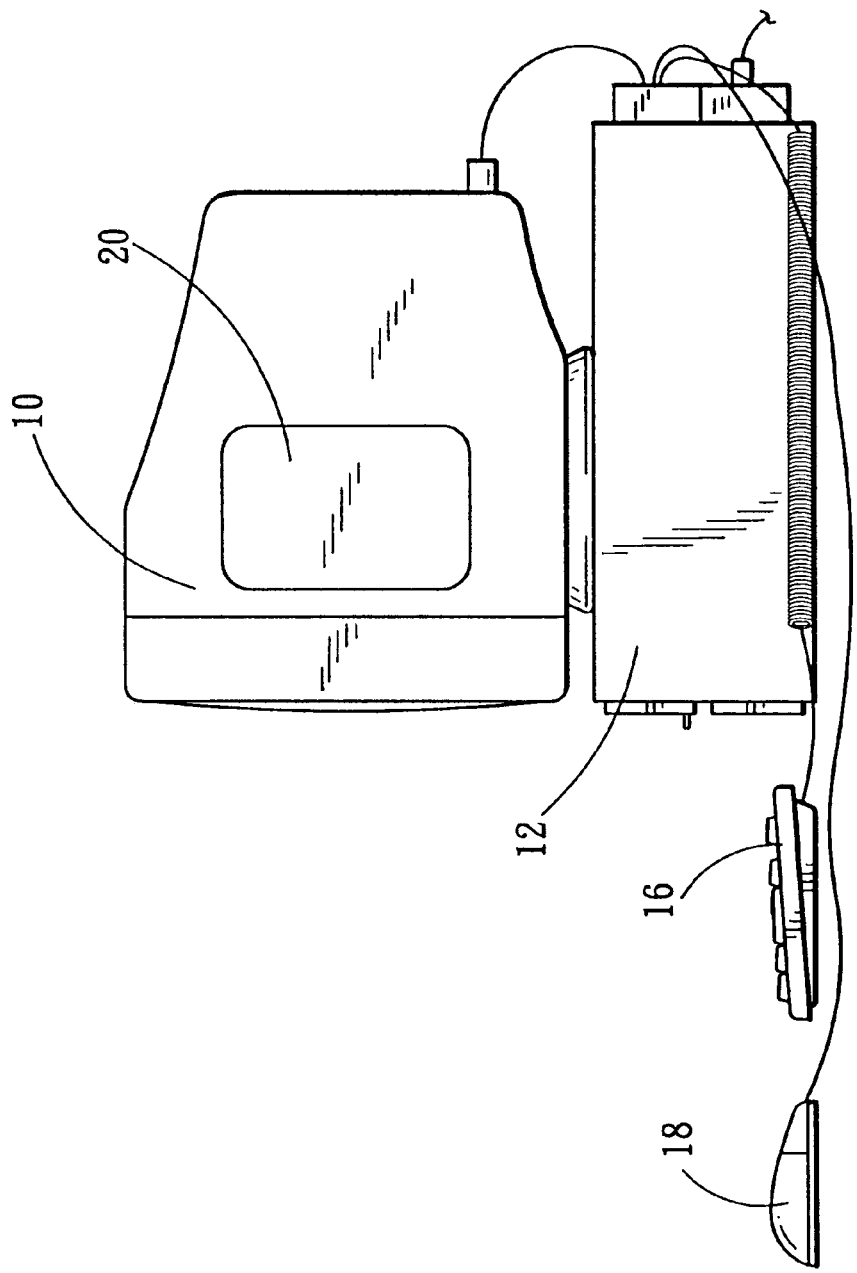
FIG. 1 is a schematic side view illustrating a conventional desktop computer.

Before the present invention is described in greater detail, it should be noted that like elements are denoted by the same reference numerals throughout the disclosure.

Figure 2:
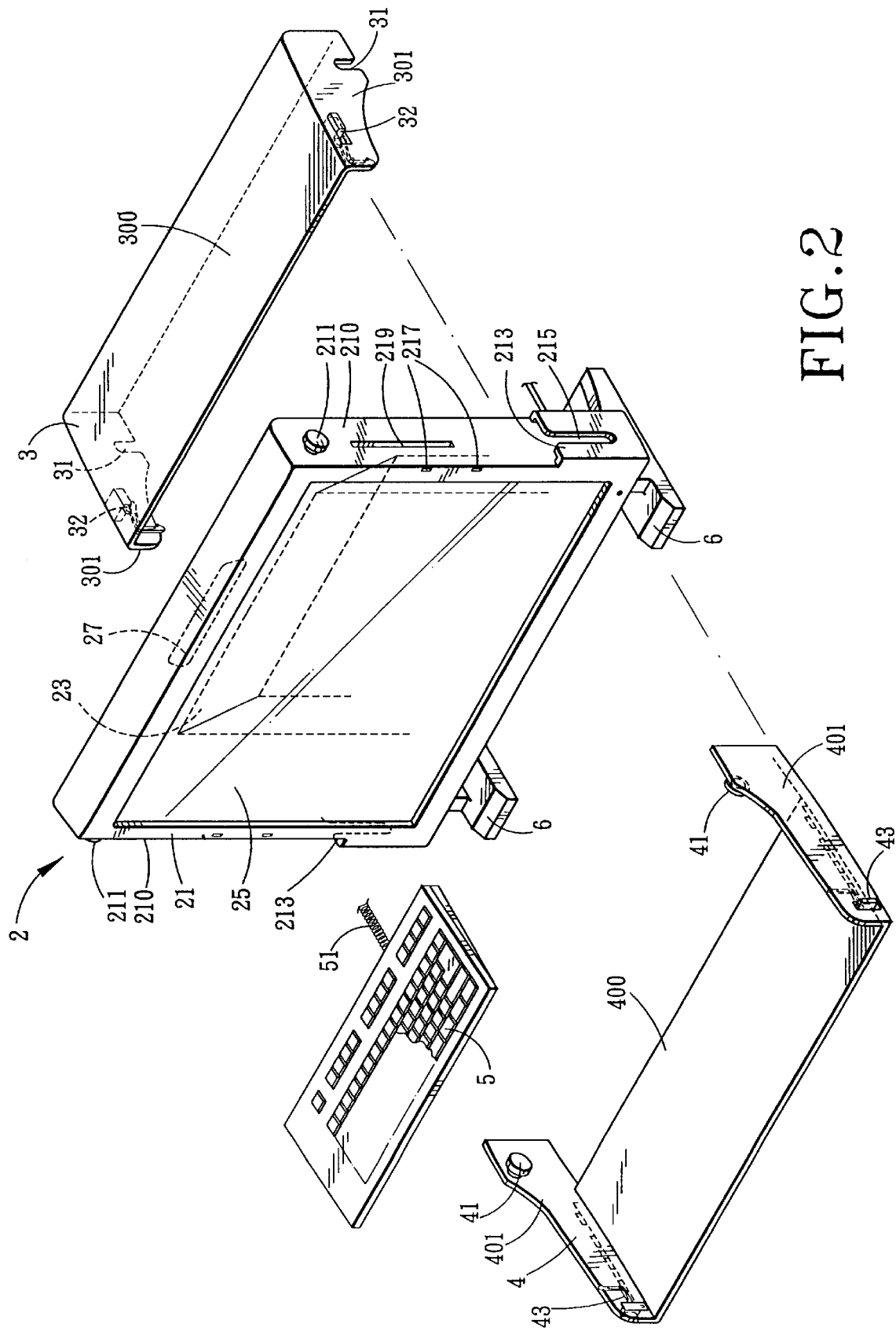
FIG. 2 is an exploded perspective view illustrating the first preferred embodiment of a desktop liquid crystal display computer according to the present invention.
Figure 3:
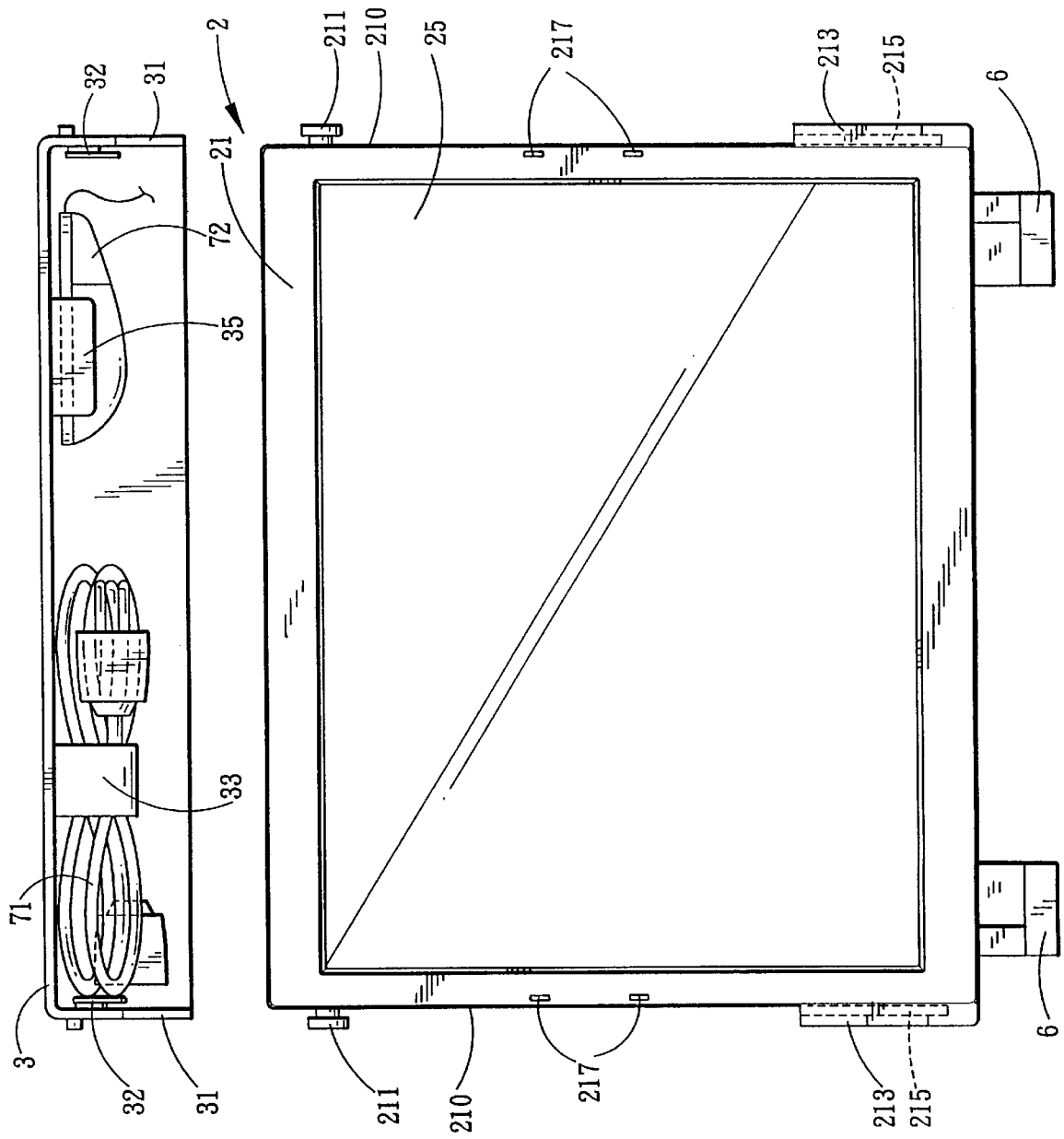
FIG. 3 is a schematic view illustrating an upper cover member and a computer housing of the first preferred embodiment.

Referring to FIGS. 2, 2A and 3, the first preferred embodiment of a desktop liquid crystal display computer according to the present invention is shown to comprise a computer housing 2, an upper cover member 3, a lower cover member 4, a computer keyboard 5, and a pair of base members 6.

The computer housing 2 includes a first housing part 21 and a second housing part 23 behind the first housing part 21. The first housing part 21 has an open front side with a liquid crystal display (LCD) panel 25 mounted thereat. The second housing part 23 has a computer main board 50 mounted therein. The LCD panel 25 is connected electrically to the computer main board 50. A speaker unit 52 is also connected electrically to the computer main board 50, and is similarly disposed inside the second housing part 23. The first housing part 21 has left and right side walls 210 with upper and lower portions. The upper wall portions of the left and right side walls 210 are formed with a pair of headed stubs 211 that are aligned with an upper horizontal axis. The lower wall portions of the left and right side walls 210 are formed with a pair of rail confining members 213. Each of the rail confining members 213 defines a vertically extending slide rail 215 with an open top end and a closed bottom end. One of the left and right side walls 210 is formed with a disk inserting slot 219 adapted for inserting a computer data disk into a disk drive 54 that is connected to the computer main board 50 and that is disposed inside the first housing part 21. The front side of the first housing part 21 has opposite lateral portions formed with upper and lower latch slots 217 at an intermediate section thereof. The first housing part 21 further has a rear side, the upper portion of which is formed with a recess 27 at an intermediate section thereof to serve as a handle so as to facilitate handling of the computer housing 2.

Figure 4:
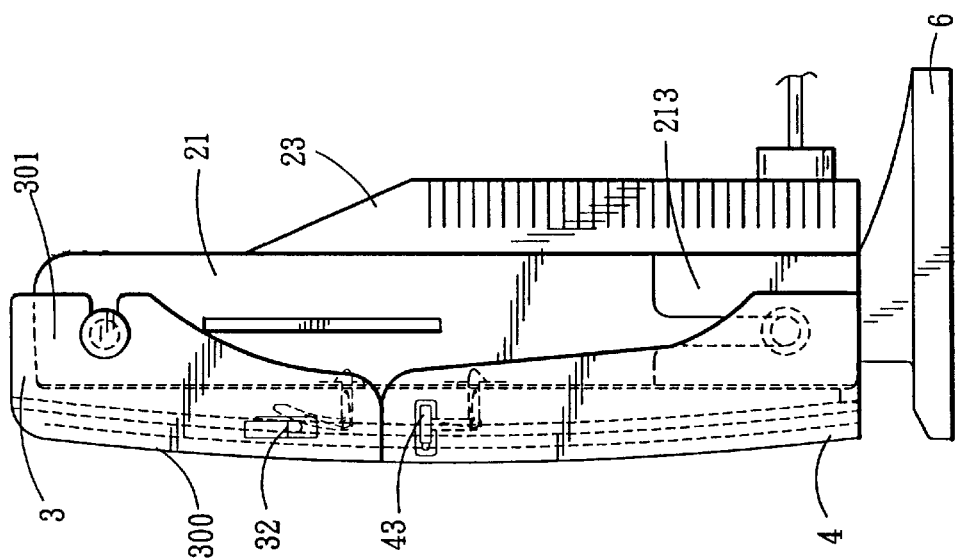
FIG. 4 is a schematic side view of the first preferred embodiment.

The upper cover member 3 includes an upper cover plate body 300 and a pair of mounting flanges 301 that extend from opposite lateral sides of the upper cover plate body 300 and that are capable of being brought into juxtaposition with the upper wall portions of the left and right side walls 210 of the first housing part 21. Each of the mounting flanges 301 is formed with a pivot slot 31 for engaging pivotally and removably the headed stub 211 on the upper wall portion of the adjacent one of the left and right side walls 210 such that the upper cover member 3 is movable relative to the first housing part 21 between an uncovering position, where the upper cover plate body 300 extends forwardly of the first housing part 21 and is generally transverse to the LCD panel 25, and where an inner wall surface of the upper cover plate body 300 faces downwardly and is disposed at a height generally higher than the LCD panel 25 (see FIG. 5), and a covering position, where the upper cover plate body 300 is disposed in front of the first housing part 21 and is generally parallel to the LCD panel 25 to shield an upper portion of the LCD panel 25 (see FIG. 4). Each of the mounting flanges 301 is further provided with a latch 32 for engaging removably a respective one of the upper latch slots 217 in the first housing part 21, thereby retaining releasably the upper cover member 3 in the covering position. The inner wall surface of the upper cover plate body 300 is provided with a pair of accommodating spaces 33, 34 for receiving a power cord 71 and a computer mouse 72, respectively.

The lower cover member 4 includes a lower cover plate body 400 and a pair of mounting flanges 401 that extend from opposite lateral sides of the lower cover plate body 400 and that are capable of being brought into juxtaposition with the lower wall portions of the left and right side walls 210 of the first housing part 21. Each of the mounting flanges 401 is formed with a headed stub 41 for engaging pivotally and removably the slide rail 215 in the rail confining member 213 on the lower wall portion of the adjacent one of the left and right side walls 210 such that the lower cover member 4 is pivotable relative to the first housing part 21 about a lower horizontal axis parallel to and disposed below the upper horizontal axis. The lower cover member 4 is movable between an uncovering position, where the lower cover plate body 400 extends forwardly of the first housing part 21 and is generally transverse to the LCD panel 25, and where an inner wall surface of the lower cover plate body 400 faces upwardly and is disposed at a height generally lower than the LCD panel 25 (see FIG. 5), and a covering position, where the lower cover plate body 400 is disposed in front of the first housing part 21 and is generally parallel to the LCD panel 25, and where the inner wall surface of the lower cover plate body 400 confronts the LCD panel 25 to shield a lower portion of the LCD panel 25 (see FIG. 4). Each of the mounting flanges 401 is further provided with a latch 43 for engaging removably a respective one of the lower latch slots 217 in the first housing part 21, thereby retaining releasably the lower cover member 4 in the covering position.

The computer keyboard 5 is mounted on the inner wall surface of the lower cover plate body 400, and is provided with a transmission cable 51 for electrical connection with the computer main board 50 inside the second housing part 23. The computer keyboard 5 is thus movable together with the lower cover member 4 relative to the first housing part 21.

Each of the base members 6 is mounted pivotally on a respective one of the lower left and lower right end portions of a bottom side of the first housing part 21. The base members 6 are adapted to support the computer housing 2 on a surface, such as a desk (not shown), and employ a known friction-type hinge (not shown) so as to be capable of frictionally retaining the computer housing 2 at a desired tilt angle relative to the surface.

Figure 5:
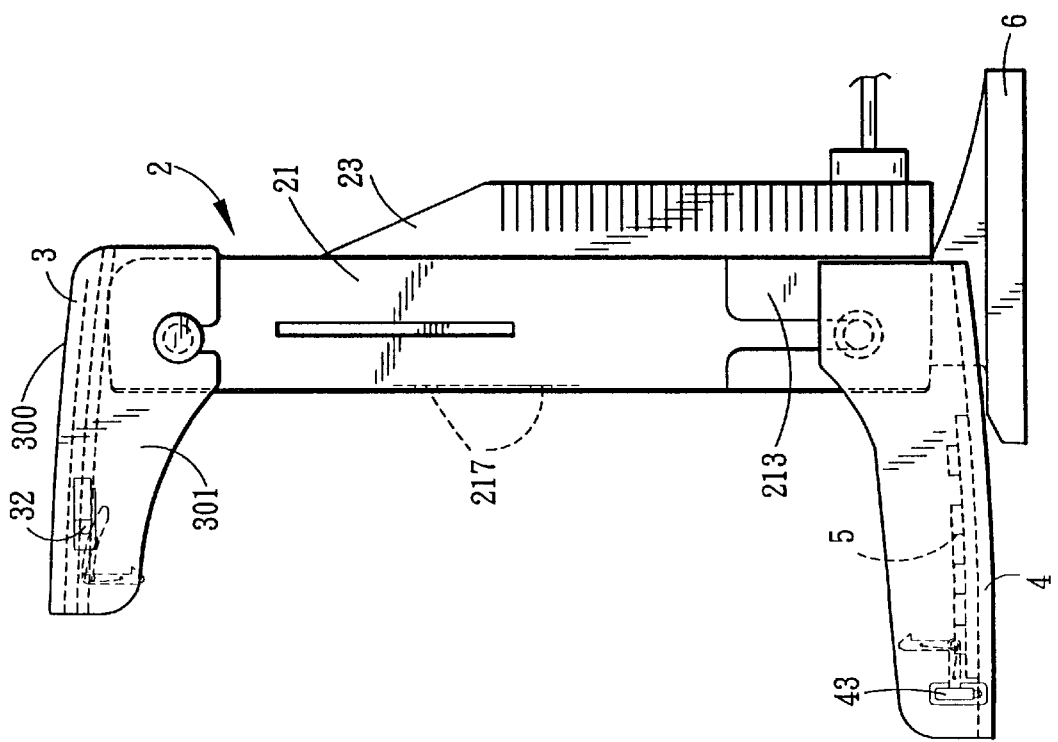
FIG. 5 is another schematic side view of the first preferred embodiment, illustrating upper and lower cover members thereof in an uncovering position.
Figure 7:
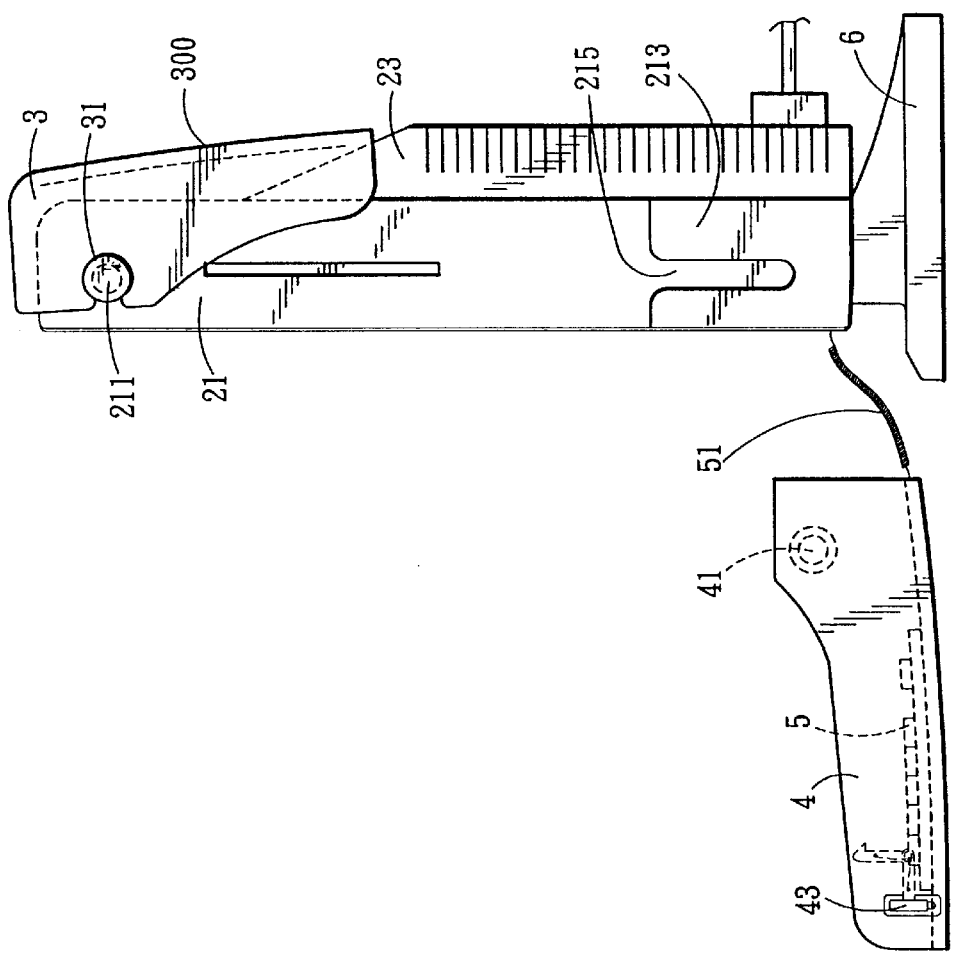
FIG. 7 is yet another schematic side view of the first preferred embodiment, illustrating the lower cover member when detached from the computer housing.
Figure 6:
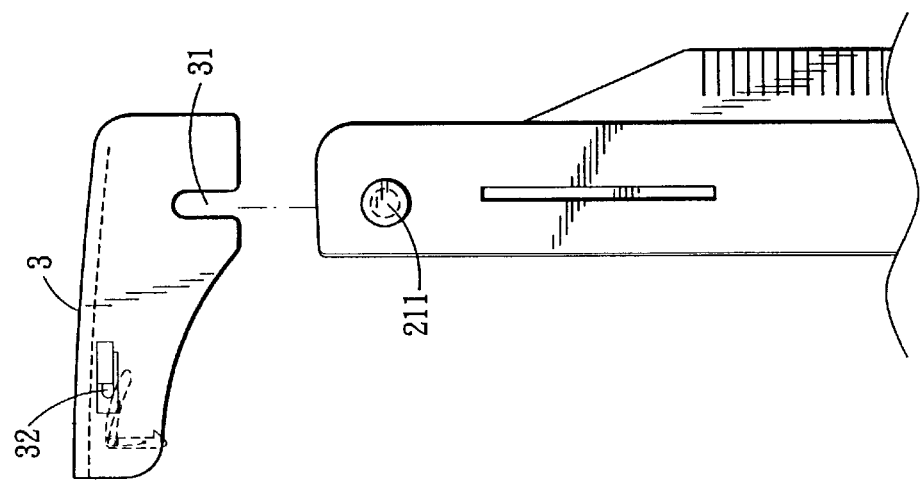
FIG. 6 is a fragmentary exploded schematic side view of the first preferred embodiment, illustrating how the upper cover member is mounted on the computer housing.

When using the computer, the upper cover member 3 is first pivoted to the uncovering position (see FIG. 5). Alternatively, the upper cover member 3 can be detached from the first housing part 21 (see FIG. 6), and reattached to the first housing part 21 such that the headed stubs 211 extend once again into the pivot slots 31 in the mounting flanges 301 with the upper cover plate body 300 disposed behind the first housing part 21 (see FIG. 7). Thereafter, the lower cover member 4 is pivoted to the uncovering position (see FIG. 5), and can be detached from the rail confining members 213 on the first housing part 21 (see FIG. 7), such that the computer keyboard 5 can be positioned at an appropriate distance from the computer housing 2 for user comfort. At this time, data inputted by typing on keys of the computer keyboard 5 can be received by the computer main board 50 (see FIG. 2A) inside the second housing part 23 via the transmission cable 51.

Figure 8:
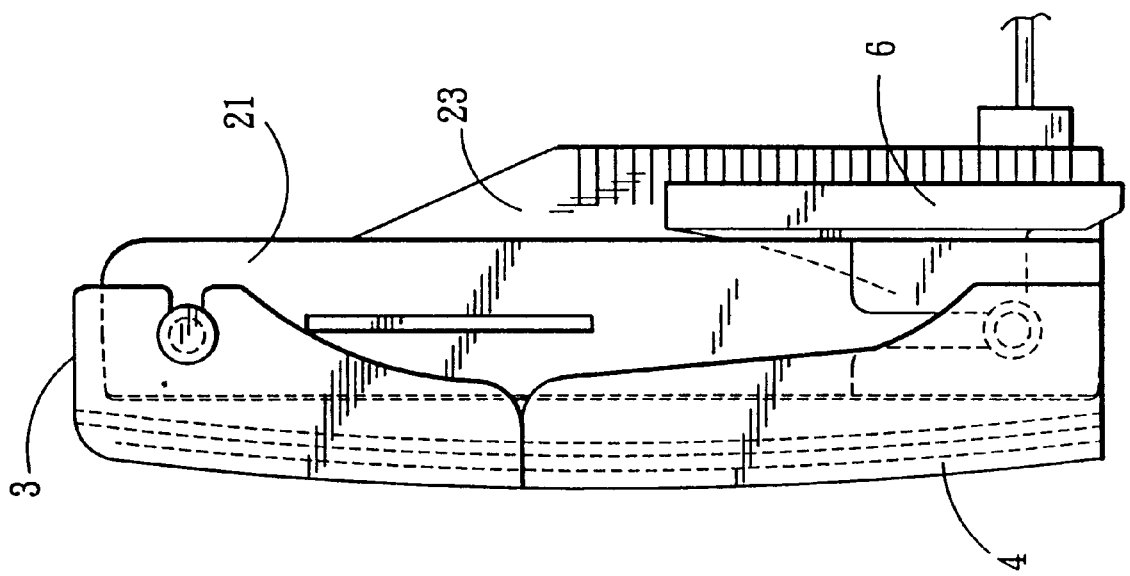
FIG. 8 is a further schematic side view of the first preferred embodiment, illustrating a base member thereof in a folded state.
Figure 9:
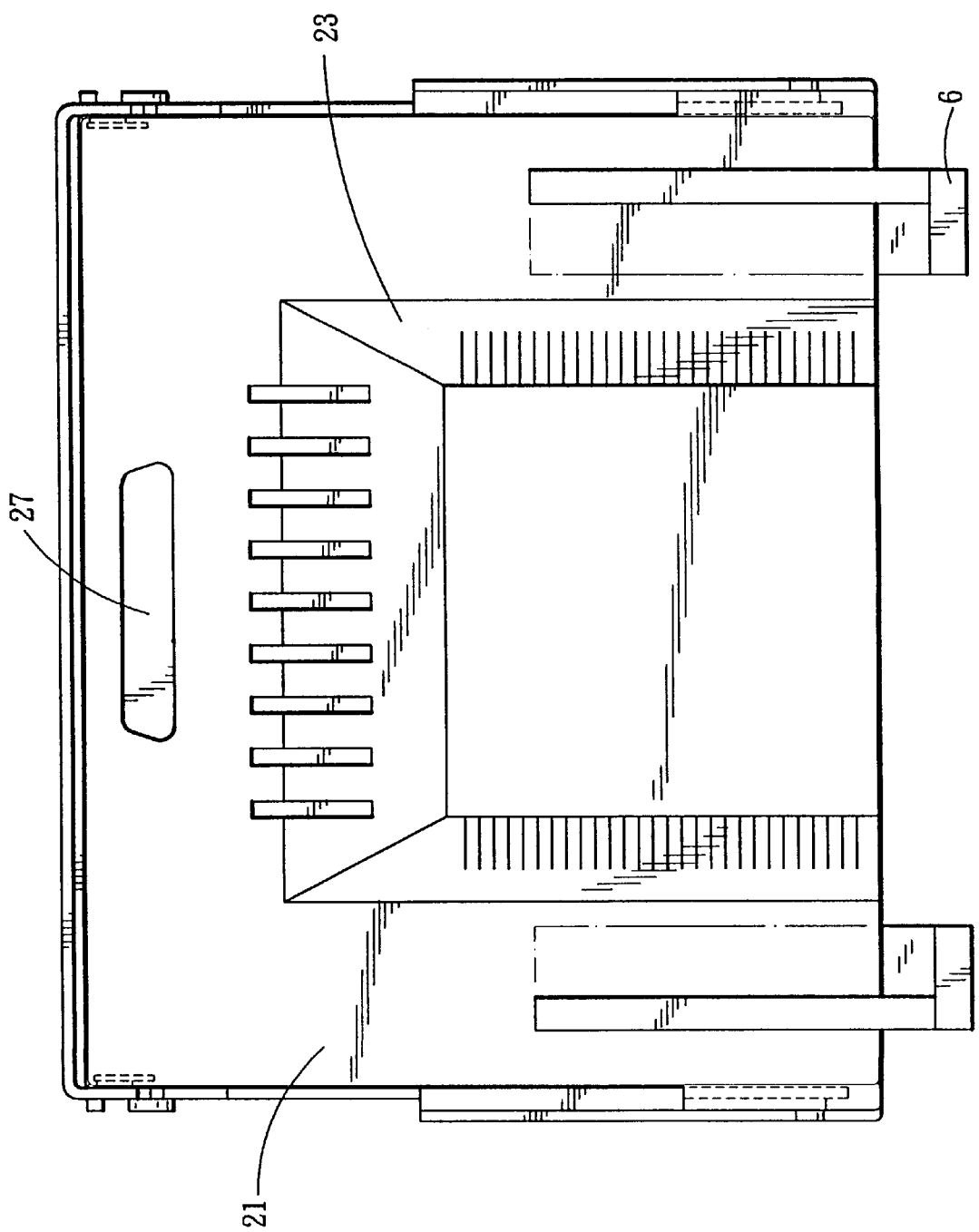
FIG. 9 is a rear schematic view of the first preferred embodiment.

With further reference to FIGS. 8 and 9, when moving the computer to another location, the upper and lower cover members 3, 4 are first pivoted to the covering position, and the base members 6 are subsequently folded to the back of the first housing part 21 at two sides of the second housing part 23. The computer housing 2 can then be lifted by handling at the recess 27 to move the same to the desired location.

Figure 10:
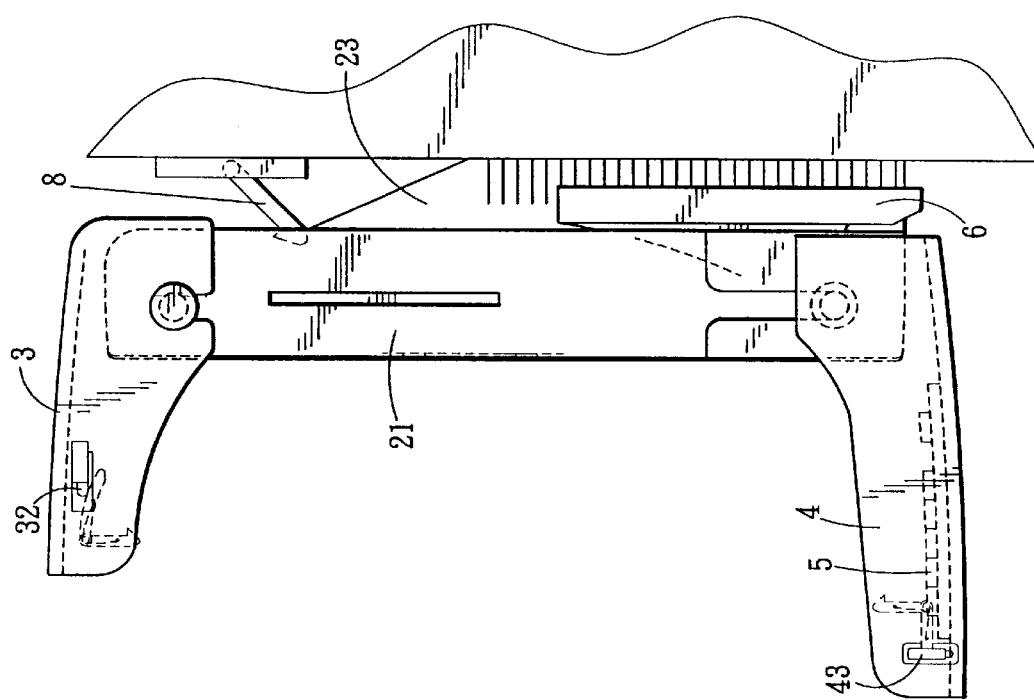
FIG. 10 is a schematic side view illustrating the first preferred embodiment when hung on a wall.

Instead of placing the computer on a desk, the computer can be mounted on a wall so as not to occupy space on the desk. Referring to FIG. 10, when mounting the computer on the wall, the base members 6 are first pivoted to the folded position, and the computer housing 2 is subsequently hung on the wall with the use of an anchoring device 8 that engages ventilation holes in the second housing part 23 of the computer housing 2. The upper and lower cover members 3, 4 can be retained in the uncovering position by virtue of their engagement with the first housing part 21 at this time.

Figure 11:
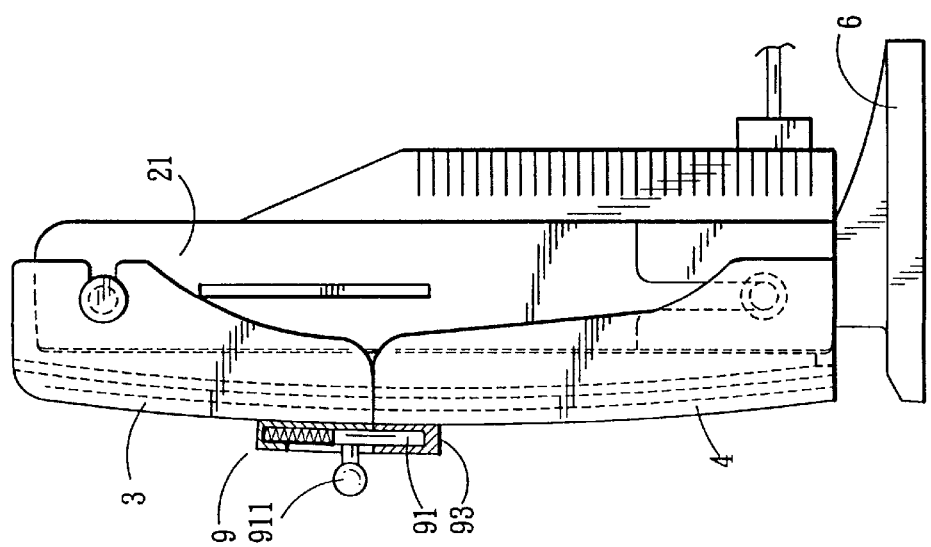
FIG. 11 is a schematic partly sectional side view of the second preferred embodiment of a desktop liquid crystal display computer according to the present invention.
Figure 12:
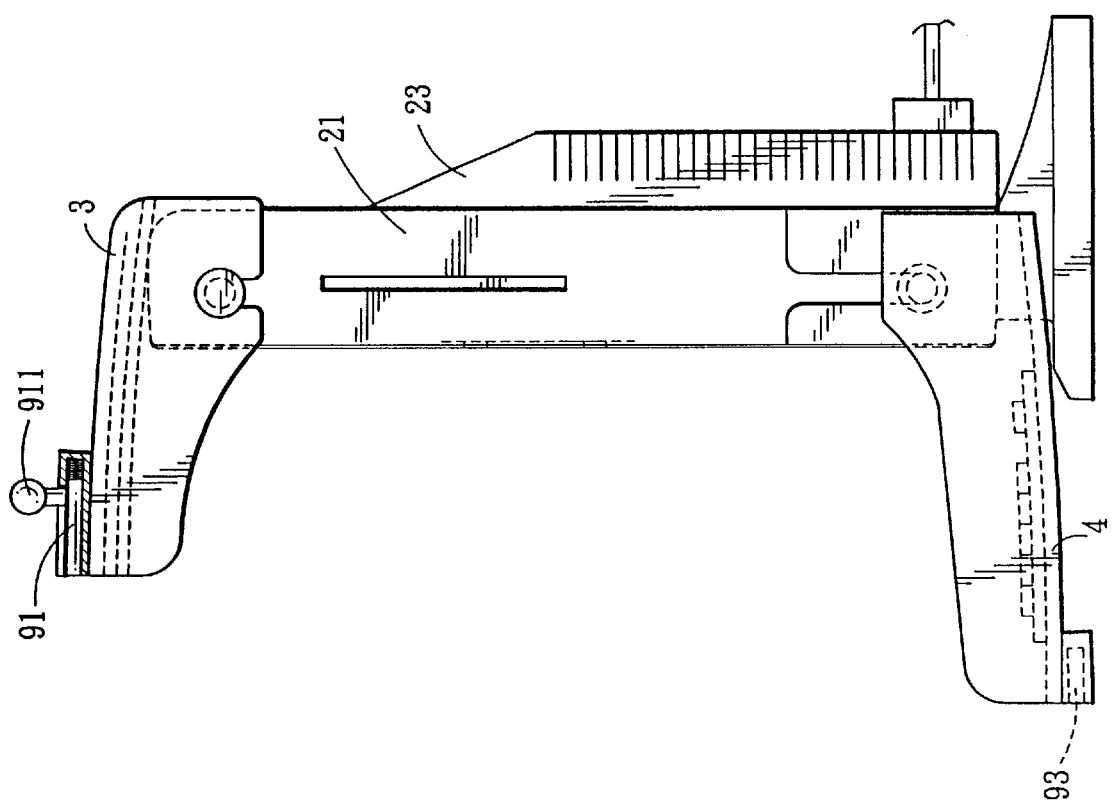
FIG. 12 is another schematic partly sectional side view of the second preferred embodiment, illustrating upper and lower cover members thereof in an uncovering position.

FIGS. 11 and 12 illustrate the second preferred embodiment of a desktop liquid crystal display computer according to the present invention. Unlike the first preferred embodiment, a releasable latch 9 is provided on outer wall surfaces of the upper and lower cover members 3, 4 to retain the latter releasably in the covering position. The releasable latch 9 includes a spring-loaded male latch member 91 that is mounted on the upper cover member 3, and a female latch member 93 that is mounted on the lower cover member 4. The male latch member 91 is provided with an operating handle 911 to facilitate movement of the male latch member 91 into the female latch member 93 for retaining the upper and lower cover members 3, 4 in the covering position, as shown in FIG. 11, or out of the female latch member 93 when disposing the upper and lower cover members 3, 4 in the uncovering position, as shown in FIG. 12.

Figure 13:
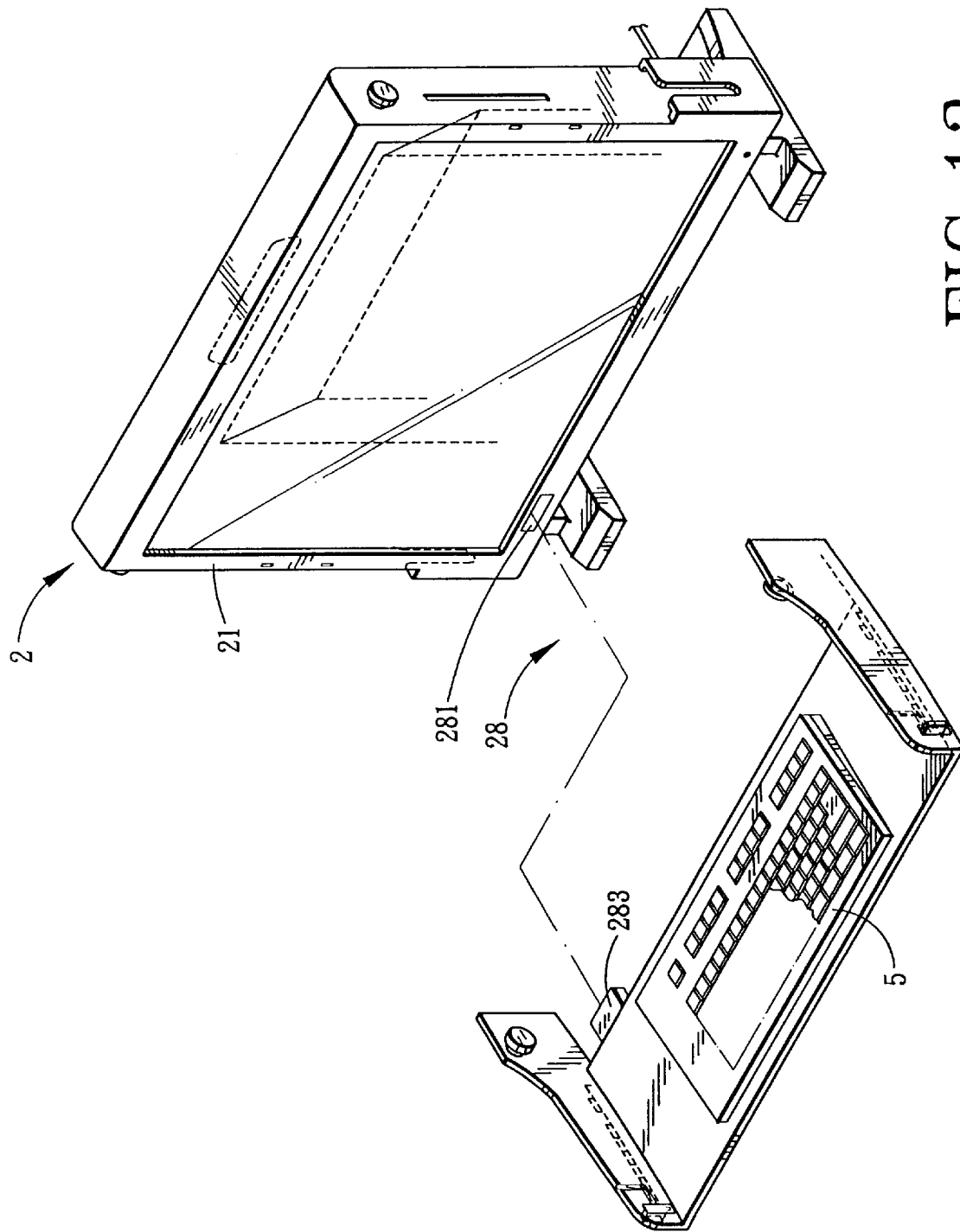
FIG. 13 is a fragmentary exploded perspective view illustrating a lower cover member and a computer housing of the third preferred embodiment of a desktop liquid crystal display computer according to the present invention.

FIG. 13 illustrates the third preferred embodiment of a desktop liquid crystal display computer according to the present invention. Unlike the previous embodiments, a known infrared transmission unit 28 is employed to establish a communications link between the computer keyboard 5 and the computer main board (not shown) inside the computer housing 2 for data transmission purposes. The infrared transmission unit 28 includes an infrared receiver 281 disposed on the first housing part 21 of the computer housing 2 and connected electrically to the computer main board (not shown), and an infrared transmitter 283 disposed on the computer keyboard 5. Data inputted via the keys of the computer keyboard 5 can be transmitted wirelessly by the infrared transmitter 283 for reception by the computer main board via the infrared receiver 281.

Figure 14:
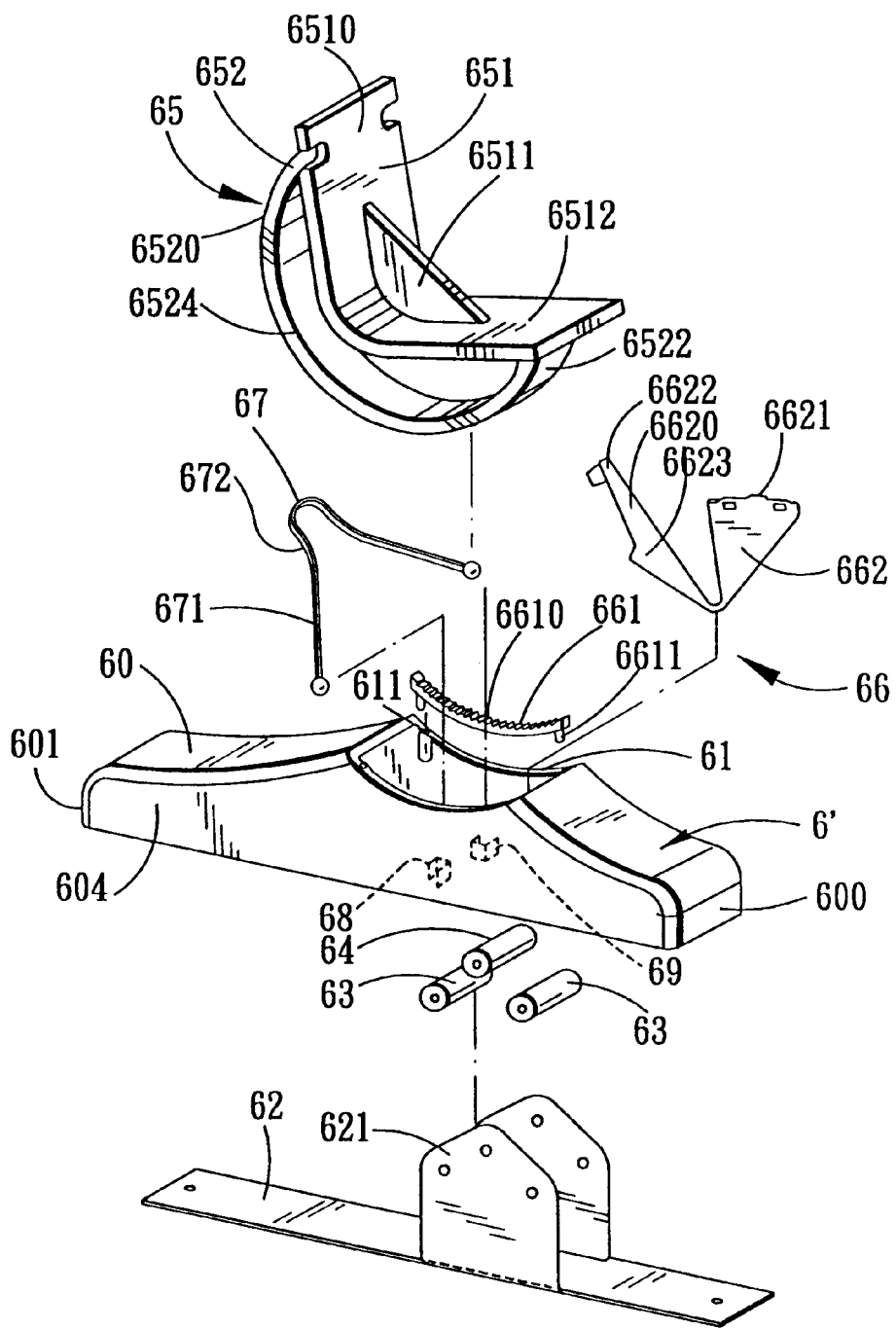
FIG. 14 is an exploded perspective view of a base member of the fourth preferred embodiment of a desktop liquid crystal display computer according to the present invention.
Figure 15:
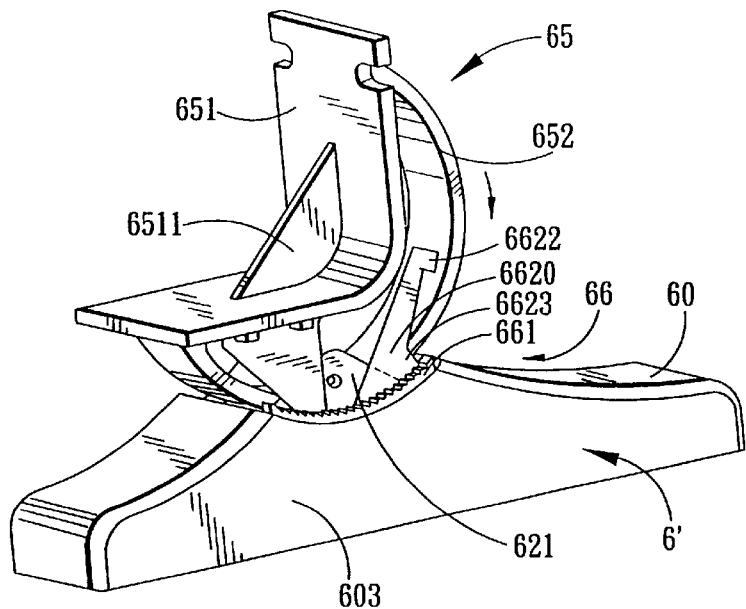
FIG. 15 is an assembled perspective view of the base member of FIG. 14.
Figure 16:
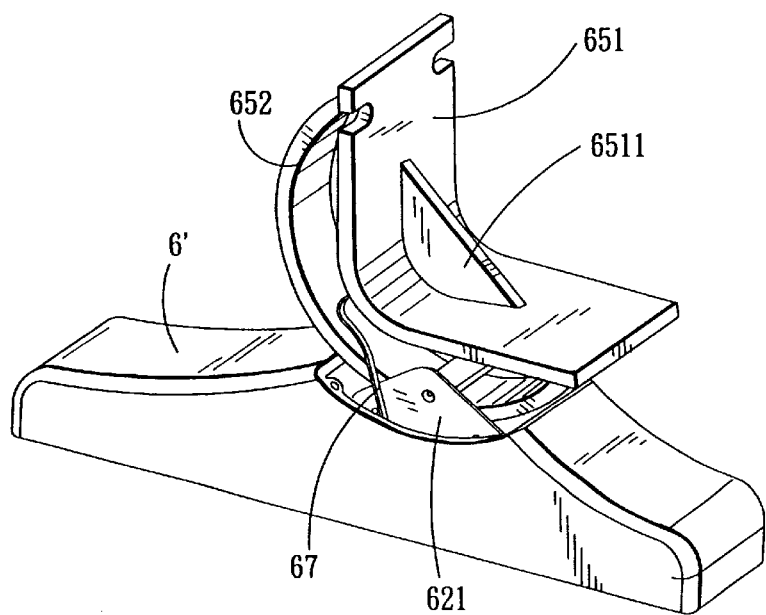
FIG. 16 is another assembled perspective view of the base member of FIG. 14 when viewed from another angle.

Referring to FIGS. 14, 15 and 16, the base member 6' of the fourth preferred embodiment of a desktop liquid crystal display computer according to the present invention is shown to comprise a hollow base body 60, a housing supporting member 65, a releasable retaining unit 66 and a biasing member 67.

The base body 60 has a front end 600, a rear end 601 opposite to the front end 600 in a longitudinal direction, a bottom side adapted to be placed on a surface, such as a desk (not shown), first and second lateral side walls 603, 604 that extend in the longitudinal direction and that are opposite to each other in a transverse direction relative to the longitudinal direction, and a top side that extends in the longitudinal direction between the front and rear ends 600, 601 and that is formed with a generally rectangular opening 61 at an intermediate section thereof. The first lateral side wall 603 is formed with a pair of insert sockets 611 (only one is shown in FIG. 14) on an inner wall surface thereof adjacent to a longitudinal edge of the opening 61. The insert sockets 611 are spaced apart in the longitudinal direction. An elongate base plate 62 is mounted securely on the bottom side of the base body 60, and has opposite longitudinal edges formed with a parallel pair of uprightly extending mounting plates 621. The mounting plates 621 have distal top portions that project upwardly at the top side of the base body 60 via the opening 61. A parallel pair of lower cylindrical rollers 63 extend between the mounting plates 621 in the transverse direction, and have opposite ends mounted rotatably on the distal top portions of the mounting plates 621, respectively. The lower cylindrical rollers 63 are spaced apart in the longitudinal direction. An upper cylindrical roller 64 also extends between the mounting plates 621 in the transverse direction, and has opposite ends mounted rotatably on the distal top portions of the mounting plates 621, respectively. The upper cylindrical roller 64 is disposed above and between the lower cylindrical rollers 63 such that the upper cylindrical roller 64 is spaced apart from each of the lower cylindrical rollers 64 in both the vertical and longitudinal directions.

Figure 17:
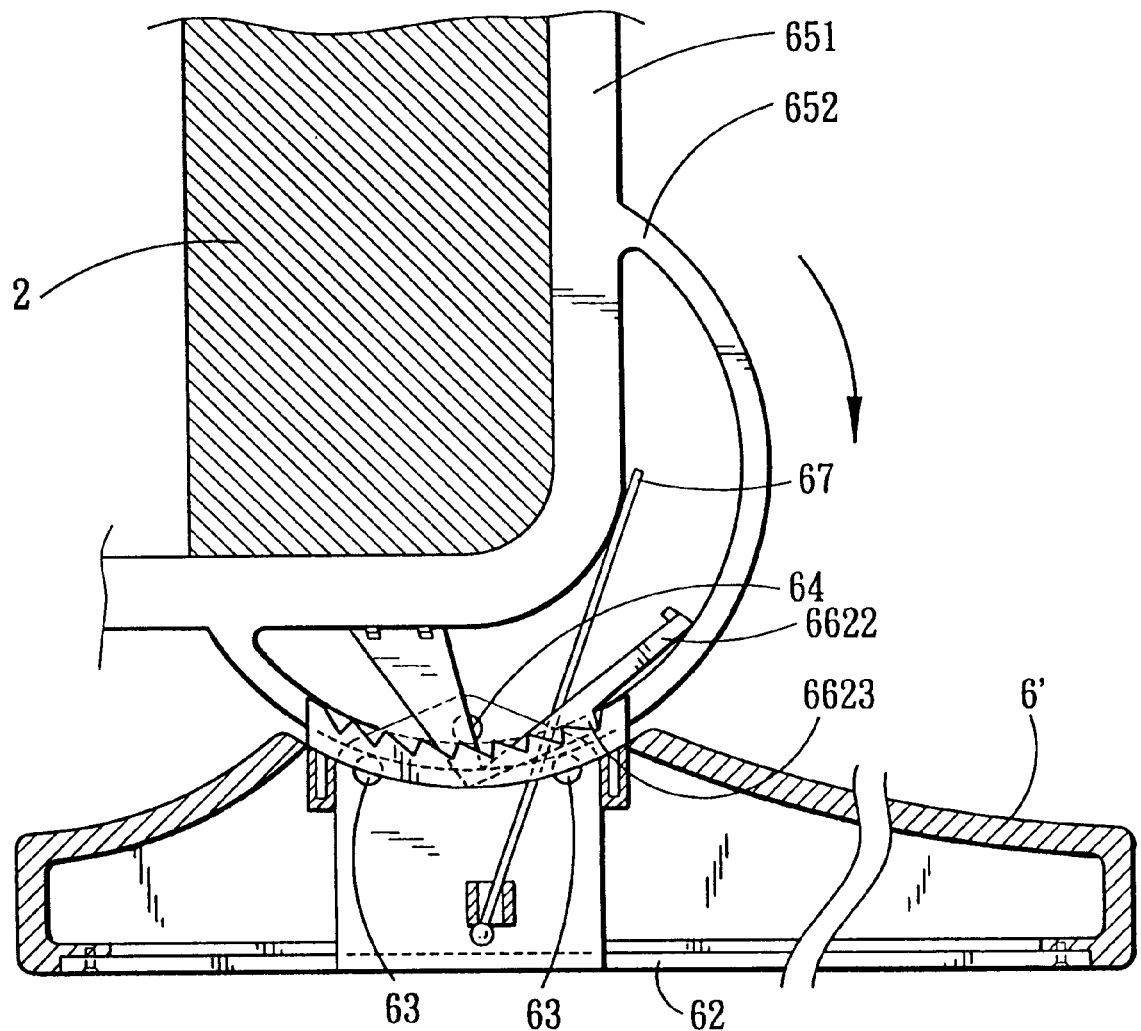
FIG. 17 is a sectional view illustrating how the base member of FIG. 14 supports a computer housing of the fourth preferred embodiment in a generally upright position.
Figure 18:
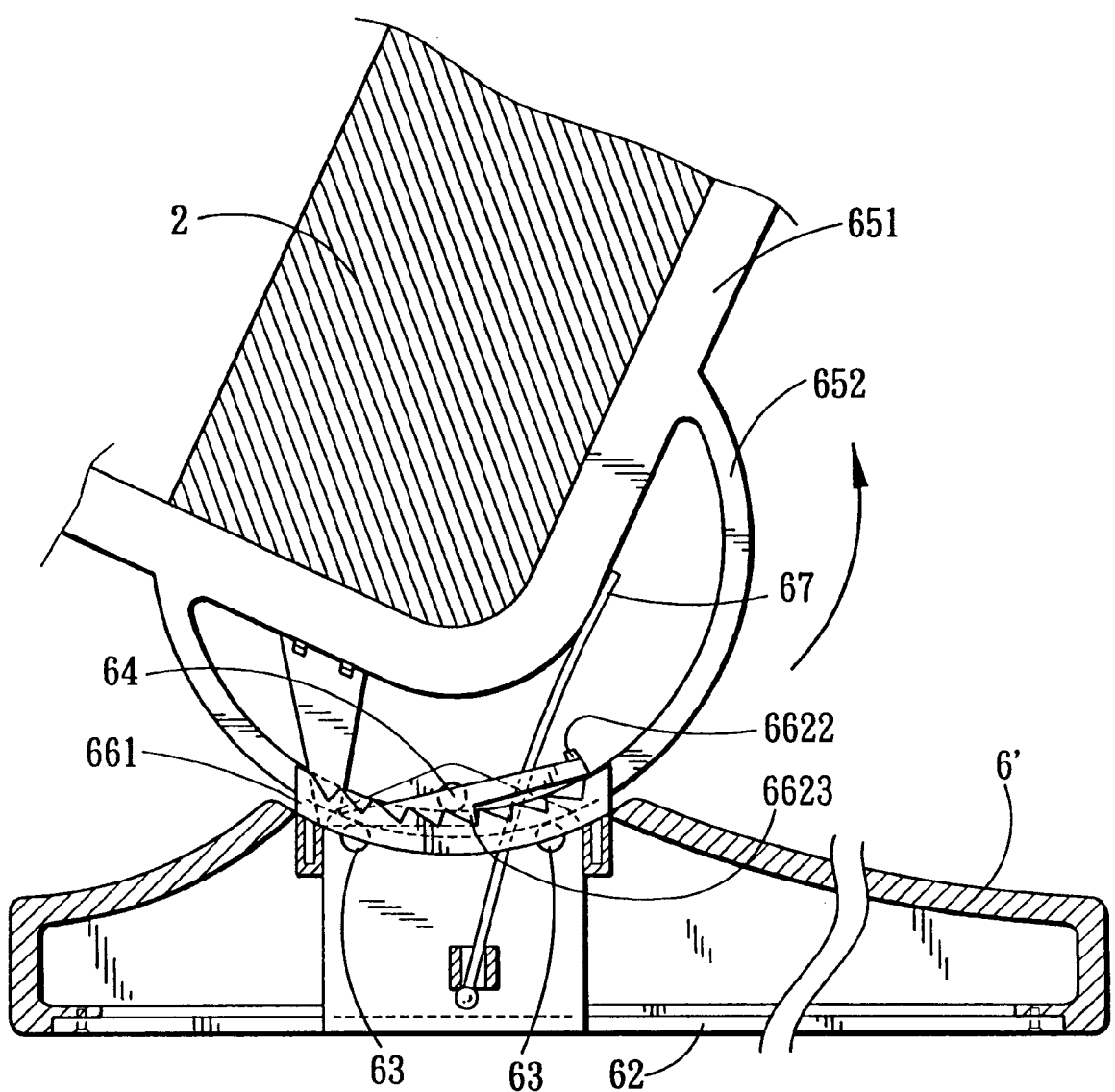
FIG. 18 is a sectional view illustrating how the base member of FIG. 14 supports the computer housing of the fourth preferred embodiment in an inclined position.
Figure 19:
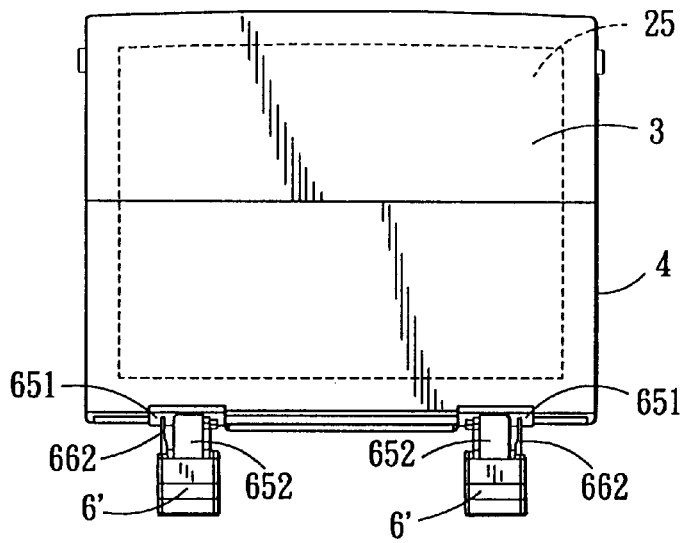
FIG. 19 is a front schematic view of the fourth preferred embodiment.
Figure 20:
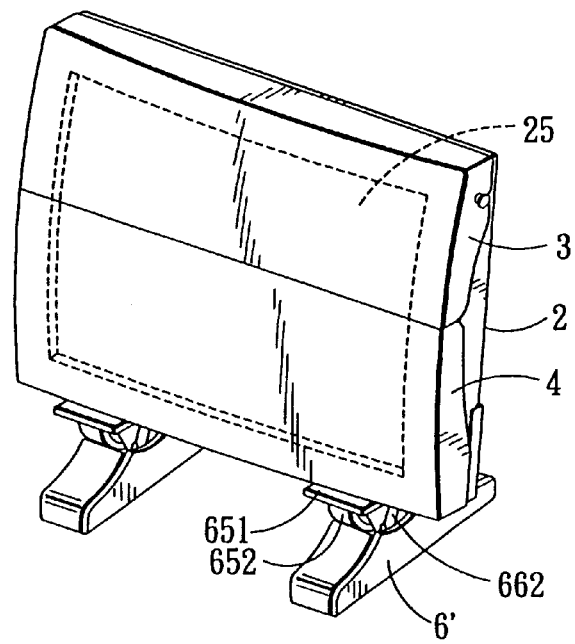
FIG. 20 is a perspective view of the fourth preferred embodiment.

The housing supporting member 65 includes a generally L-shaped housing mounting portion 651, and a generally C-shaped slide plate portion 652. The housing mounting portion 651 has an upright plate section 6510 with upper and lower ends, and a transverse plate section 6512 that extends from the lower end of the upright plate section 6510. The slide plate portion 652 has a first end portion 6520 disposed behind the upright plate section 6510 and connected to the upper end of the upright plate section 6510, a second end portion 6522 disposed below the transverse plate section 6512 and connected to the transverse plate section 6512, and an intermediate portion 6524 between the first and second end portions 6520, 6522. The intermediate portion 6524 is clamped by the lower and upper cylindrical rollers 63, 64 such that a bottom surface of the intermediate portion 6524 is in contact with the lower cylindrical rollers 63, while a top surface of the intermediate portion 6524 is in contact with the upper cylindrical roller 64. By virtue of the engagement between the slide plate portion 652 and the lower and upper cylindrical rollers 63, 64, the housing mounting portion 651 can be tilted forwardly and rearwardly relative to the base body 60. The housing mounting portion 651 further has an engaging plate disposed at a juncture of a front side of the upright plate section 6510 and a top side of the transverse plate section 6512 for engaging the computer housing 2 (see FIG. 17).

The retaining unit 66 includes an elongate rack member 661 formed with rack teeth 6610, and a restraining member 662. The rack member 661 is formed with a pair of mounting legs 6611 that extend downwardly into the base body 60 via the opening 61 for engaging the insert sockets 611 on the first lateral side wall 603, thereby mounting the rack member 661 on the top side of the base body 60 at one side of the housing supporting member 65. The rack member 661 extends in the longitudinal direction. The restraining member 662, which is in a form of a generally V-shaped plate, extends into the base body 60 through the opening 61 and is disposed between the insert sockets 611. The restraining member 662 has an anchoring portion 6621 with an upper section secured to the housing mounting portion 651 of the housing supporting member 65, and an engaging portion 6620 that extends from a lower section of the anchoring portion 6621 and that forms an angle with the anchoring portion 6621. The engaging portion 6620 has a distal operating section 6622 disposed outwardly of the base body 60, and an intermediate section formed with a pawl 6623 for engaging selectively the rack teeth 6610 of the rack member 661.

The biasing member 67 is in the form of a generally U-shaped spring strip having first and second leg portions 671, 672. Each of the first and second leg portions 671, 672 extends into the base body 60 through the opening 61, and has a lower leg end anchored to the base body 60 at a leg retainer 68, 69 that is provided on the inner wall surface of a respective one of the first and second lateral side walls 603, 604 of the base body 60, and an upper leg end that abuts against a rear side of the upright plate section 6510 of the housing mounting portion 651 of the housing supporting member 65. The biasing member 67 resists forward tilting movement of the housing mounting portion 651 relative to the base body 60.

With further reference to FIGS. 17 to 20, in use, a pair of the base members 6' support lower left and lower right corners of a bottom side of the first housing part of the computer housing 2. Particularly, the engaging plate 6511 on the housing mounting portion 651 of the housing supporting member 65 of each of the base members 6' engages a respective one of the lower left and lower right corners of the bottom side of the first housing part of the computer housing 2. When it is desired to adjust the tilting angle of the LCD panel 25 on the computer housing 2, the distal operating section 6622 of the engaging portion 6620 of the restraining member 662 is operated to disengage the pawl 6623 from the rack teeth 6610 of the rack member 661. The computer housing 2 can then be tilted rearwardly from a generally upright position (see FIG. 17) to an inclined position (see FIG. 18), or forwardly from the inclined position back to the generally upright position. Upon locating the LCD panel 25 on the computer housing 2 at the desired tilting angle relative to the base body 60, the distal operating section 6622 of the engaging portion 6620 of the restraining member 662 is once again operated to engage the pawl 6623 with the rack teeth 6610 of the rack member 661, thereby arresting relative movement between the base body 60 and the housing supporting member 65 to retain the LCD panel 25 at the desired tilting angle.

The retaining unit 66 provides a relatively strong retention force for retaining the computer housing 2 at the desired tilting angle without slipping. Moreover, the spring force of the biasing member 67 can be selected according to the range of tilting movement and the size of the computer housing 2 to assist in the adjustment of the tilting angle of the latter.

Some of the advantages of the desktop liquid crystal display computer of this invention are as follows:

1. The LCD panel, the computer main board and the speaker unit are integrated into a single computer housing, and the computer keyboard and the computer mouse are mounted on the lower cover member and the upper cover member, respectively. As such, the desktop liquid crystal display computer does not take up too much space on a desk, and can be easily and conveniently moved from one location to another.

2. The upper and lower cover members can be disposed in the covering position to shield the LCD panel when the desktop liquid crystal display computer of this invention is not in use.

3. The computer keyboard is mounted on the lower cover member, which is detachable from the computer housing. As such, the computer keyboard can be easily disposed at an appropriate position relative to the LCD panel during use for user comfort.

4. The desktop liquid crystal display computer of this invention can be used while hung on a wall so as not to occupy space on a desk.

5. The energy consumption and the radiation attributed to the LCD panel are less than those of conventional cathode ray tube monitors.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A desktop liquid crystal display computer, comprising:
    a computer housing having a front side with a liquid crystal display panel mounted thereat, and a computer main board mounted in said computer housing and connected electrically to said liquid crystal display panel;
    a lower cover member including a lower cover plate body having an inner wall surface and opposite lateral sides that are mounted pivotally on said computer housing about a lower horizontal axis, said lower cover member being movable relative to said computer housing between an uncovering position, where said lower cover plate body extends forwardly of said computer housing and is generally transverse to said liquid crystal display panel and where said inner wall surface of said lower cover plate body faces upwardly and is disposed at a height generally lower than said liquid crystal display panel, and a covering position, where said lower cover plate body is disposed in front of said computer housing and is generally parallel to said liquid crystal display panel and where said inner wall surface of said lower cover plate body confronts said liquid crystal display panel; and
    a computer keyboard mounted on said inner wall surface of said lower cover plate body.

2. The desktop liquid crystal display computer as claimed in claim 1, wherein said liquid crystal display panel has an upper portion and a lower portion shielded by said lower cover member when said lower cover member is in the covering position, said desktop liquid crystal display computer further comprising an upper cover member having an upper cover plate body, said upper cover member being movable relative to said computer housing between an uncovering position, where said upper cover plate body is generally transverse to said liquid crystal display panel, and a covering position, where said upper cover plate body is disposed in front of said computer housing and is generally parallel to said liquid crystal display panel to shield said upper portion of said liquid crystal display panel.

3. The desktop liquid crystal display computer as claimed in claim 1, wherein said lower cover member is mounted removably on said computer housing.

4. The desktop liquid crystal display computer as claimed in claim 1, wherein said computer keyboard is provided with a transmission cable for electrical connection with said computer main board inside said computer housing.

5. The desktop liquid crystal display computer as claimed in claim 1, further comprising infrared transmission means for establishing a communications link between said computer keyboard and said computer main board inside said computer housing.

6. The desktop liquid crystal display computer as claimed in claim 1, further comprising a speaker unit mounted to said computer housing and connected electrically to said computer main board inside said computer housing.

7. The desktop liquid crystal display computer as claimed in claim 1, wherein said computer housing includes a first housing part having said liquid crystal display panel mounted thereat, and a second housing part disposed behind said first housing part and having said computer main board mounted therein.

8. The desktop liquid crystal display computer as claimed in claim 1, wherein said computer housing is formed with a handle to facilitate handling of said computer housing.

9. The desktop liquid crystal display computer as claimed in claim 1, further comprising at least one base member mounted on a bottom side of said computer housing and adapted to support said computer housing on a surface.

10. The desktop liquid crystal display computer as claimed in claim 2, wherein said upper cover plate body has opposite lateral sides that are mounted pivotally on said computer housing about an upper horizontal axis parallel to and disposed above the lower horizontal axis, said upper cover plate body extending forwardly of said computer housing and having an inner wall surface that faces downwardly and that is disposed at a height generally higher than said liquid crystal display panel when said upper cover member is in the uncovering position.

11. The desktop liquid crystal display computer as claimed in claim 2, further comprising latch means for retaining releasably said lower and upper cover members in the covering position.

12. The desktop liquid crystal display computer as claimed in claim 2, wherein said upper cover plate body is provided with an accommodating space adapted for retaining a power cord.

13. The desktop liquid crystal display computer as claimed in claim 2, wherein said upper cover plate body is provided with an accommodating space adapted for retaining a computer mouse.

14. The desktop liquid crystal display computer as claimed in claim 2, wherein said upper cover member is mounted removably on said computer housing.

15. The desktop liquid crystal display computer as claimed in claim 11, wherein said latch means are provided on said lower and upper cover members and engage releasably said computer housing for retaining releasably said lower and upper cover members in the covering position.

16. The desktop liquid crystal display computer as claimed in claim 11, wherein said latch means includes complementary male and female latch members provided respectively on said lower and upper cover members.

17. The desktop liquid crystal display computer as claimed in claim 16, wherein said base member is mounted pivotally on said computer housing and is capable of frictionally retaining said computer housing at a desired tilt angle relative to the surface.

18. The desktop liquid crystal display computer as claimed in claim 16, wherein said base member comprises:
 a base body having a top side and a pair of mounting plates that project upwardly at said top side and that are spaced apart in a transverse direction;
 a housing supporting member having said computer housing mounted thereon, said housing supporting member being mounted movably between said mounting plates, and being movable relative to said base body in a first direction for locating said liquid crystal display panel in a generally upright position relative to said base body and in a second direction for locating said liquid crystal display panel in an inclined position relative to said base body; and
 a releasable retaining unit provided on said base body and said housing supporting member to arrest relative movement therebetween.

19. The desktop liquid crystal display computer as claimed in claim 18, wherein said base member further comprises a biasing member mounted on said base body and acting on said housing supporting member to provide resistance to movement of said housing supporting member in the second direction.

20. The desktop liquid crystal display computer as claimed in claim 18, wherein:
 said base body has a pair of lower cylindrical rollers that extend between and that are mounted rotatably on said mounting plates, and an upper cylindrical roller that extends between and that is mounted rotatably on said mounting plates, said upper cylindrical roller being disposed above and between said lower cylindrical rollers; and
 said housing supporting member includes a generally L-shaped housing mounting portion and a generally C-shaped slide plate portion, said housing mounting portion having an upright plate section and a transverse plate section that extends from said upright plate section, said slide plate portion having a first end portion disposed behind and connected to said upright plate section, a second end portion disposed below and connected to said transverse plate section, and an intermediate portion between said first and second end portions and having upper and lower surfaces, said intermediate portion being clamped by said lower and upper cylindrical rollers such that said bottom surface is in contact with said lower cylindrical rollers and said top surface is in contact with said upper cylindrical roller.

21. The desktop liquid crystal display computer as claimed in claim 18, wherein said retaining unit includes:
 an elongate rack member mounted on said base body at one side of said housing supporting member and formed with rack teeth thereon; and
 a restraining member mounted on said housing supporting member and provided with a pawl for engaging selectively and removably said rack teeth of said rack member.

22. The desktop liquid crystal display computer as claimed in claim 19, wherein said biasing member has first and second leg portions, each of which has a lower leg end that is anchored to said base body, and an upper leg end that abuts against said housing supporting member.

23. The desktop liquid crystal display computer as claimed in claim 20, wherein said housing mounting portion is provided with a housing engaging plate for mounting said computer housing on said housing mounting portion.

24. The desktop liquid crystal display computer as claimed in claim 21, wherein said restraining member is generally V-shaped and has an anchoring portion secured to said housing supporting member, and an engaging portion that extends from said anchoring portion and that is formed with said pawl.

25. The desktop liquid crystal display computer as claimed in claim 24, wherein said engaging portion forms an angle with said anchoring portion, and has a distal operating section and an intermediate section formed with said pawl.

26. The desktop liquid crystal display computer as claimed in claim 21, wherein said rack member is mounted on said top side of said base body and extends in a longitudinal direction relative to the transverse direction.

* * * * *